June 22, 1954

H. HEINE 2,681,592

TRAVERSING MECHANISM FOR OBJECT
MOUNTING MICROSCOPE STAGES

Filed June 15, 1950

INVENTOR.
HERMANN HEINE
BY
Benj. T. Rauber
HIS ATTORNEY

Patented June 22, 1954

2,681,592

UNITED STATES PATENT OFFICE 2,681,592

TRAVERSING MECHANISM FOR OBJECT MOUNTING MICROSCOPE STAGES

Hermann Heine, Wetzlar, Germany, assignor to Ernst Leitz G. m. b. H., Wetzlar, Germany, a corporation of Germany Application June 15, 1950, Serial No. 168,207

2 Claims. (Cl. 88—40)

Heretofore traversing stages or stage plates of optical instruments, particularly for traversing the stages of microscopes in directions at a right angle, have been provided with swallow tail guides. Since, in order to permit the illuminating or reflected light to pass through the opening at the central part of the stage, the drive for the traverse must be taken from one side of the stage, a canting easily occurs through the friction or sticking of the slide elements, so that the exactitude in the positioning of the microscope object can be significantly destroyed. Moreover, stages of this construction must be formed of thick material in order to eliminate bending.

In order to attain a light running stage, ball guides have also been used. Thus a thinner stage plate can be arrived at because the ball guides can be arranged on the side surfaces of the stage. Brake arrangements must be present for these guides in order that the stage can be set in any desired place without interference. Stages of this type are expensive because of their complex construction.

In base draw-out folding photographic cameras, guides have been known in the form of flat ribbon like rails, guided in complementary small furrows and with both arranged in opposed side faces of the guide body and slits. Whenever the drive for these guides is not in the middle between both rails a canting may be observed, which can even make the camera extension impossible. Since, as explained above, the drive can not be placed in the middle between both guide rails, a transfer arrangement of this kind can not be applied directly to an object stage, although it would in itself make possible a stage plate of inexpensive construction and of thin material.

According to my invention a traverse of level ribbonlike supporting rails are mounted in the side edges of the table plate working in complementary positioned grooves in the microscope object stage and with at least one additional rail as a guide rail in the upper face arranged in an opposed guide groove in the opposed underside of the neighboring stage. In order to ensure a smooth running of the guide this guide rail is preferably arranged on the side of the drive between the support rails and stage opening. Support rails and guide rails are set in saw cuts. The rails are preferably made of spring steel ribbon. Also the guide grooves are formed by a simple saw cut. An inexpensive traverse guide and one free from objection can thus be attained and, moreover, the stage can be made correspondingly thin which is advantageous in certain cases for the lighting arrangement of the object mounted on the stage.

In the drawings the invention is illustrated by way of example in an embodiment in a microscope object stage in which—

Figures 1, 2:
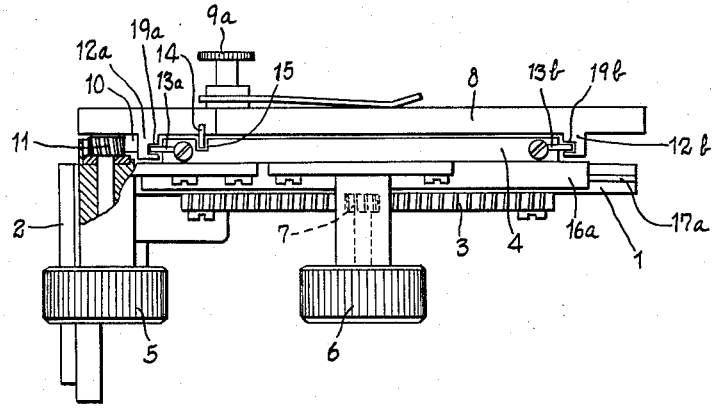
Fig. 1 is a side elevation of the stage.
Fig. 2 is an elevation of the stage partly in section, taken at a right angle to that of Fig. 1.

The stage comprises three plates, of which the lowest plate 1 carries a bracket 2 to be secured to the microscope stand, and also a rack bar 3. A middle plate 4 carries two driving knobs 5 and 6 on the latter of which is secured the pinion 7 which at one side meshes with the rack bar 3. The individual stage plate 8 on which the object is to be mounted and secured by clamps 9a and 9b, carries also a rack bar 10 which meshes with a pinion 11 of the driving knob 5. The stage plate 8 carries on its underside two ribs 12a and 12b in which grooves 19a and 19b are cut in opposed or complementary positions to receive supporting rails 13a and 13b in the plate 4. Besides the plate 8 carries on its underside the guide rail 14 which runs in the groove 15 on the upper side of the plate 4.

In a similar manner the middle plate 4 also has on its underside two ribs 16a and 16b at right angles to the ribs 12a and 12b of plate 8 and with supporting grooves 20a and 20b for the support rails 17a and 17b mounted in the plate 1. In addition the plate 4 carries on its underside a guide rail 18, which guides in a similarly arranged groove 21 of the plate 1.

Through actuation of the driving knobs 5 and 6 the object can be moved under the microscope in both coordinate directions at right angles to each other.

Having described my invention, what I claim is:

1. An object mounting microscope stage comprising a first plate-like member having an upper surface substantially parallel to the plane of the stage and having a pair of parallel supporting side faces substantially normal to the plane of said stage each grooved longitudinally, a second plate-like member superposed on said first plate-like member with a lower surface opposed to the upper surface of the first plate-like member and having a pair of parallel supporting side faces substantially normal to the plane of the stage, one of said side faces being opposed to one of the side faces of the first member and grooved in the plane of the groove of said opposed side face of said first member and the other side face of said second member being opposed to the other side face of the first member and grooved in the plane of the groove of its respective opposed side face, a pair of plane longitudinally extending supporting rails, one for each pair of opposed supporting side faces of said members and fitting into the opposed grooves of its respective pair of side faces to permit relative movement of said members, the opposed upper surface of said first member and the lower surface of said second member each having a guide groove parallel to said side faces and opposed to the groove of the other member and a flat guide rail fitted at its longitudinal edges into said guide grooves to permit relative sliding of said members longitudinally of said grooves.

2. The object mounting microscope stage of claim 1 in which said second plate-like member has an upper surface substantially parallel to the plane of the stage and has a second pair of parallel supporting side faces substantially normal to the plane of said stage and normal to the pair of parallel supporting side faces of claim 1, each grooved longitudinally, a third plate-like member superposed on said second plate-like member with a lower surface opposed to the upper surface of said second plate-like member and having a pair of parallel supporting side faces substantially normal to the plate of the stage, one of said side faces being opposed to one of the side faces of the second pair of supporting side faces of said second member and each grooved in the plane of the groove of said opposed side face of said second member and the other side face of said third member being opposed to the other side face of the second pair of side faces of said second member and grooved in the plane of the groove of its respective opposed side face, a pair of longitudinally extending supporting rails, one for each of said pair of opposed supporting side faces of said second and third members, and fitting into the opposed grooves of its respective pair of side faces to permit relative movement of said members, the opposed upper surface of said second member and the lower surface of said third member each having a guide groove parallel to the opposed side faces of said second and third members and opposed to the groove of the other of said second and third members and a flat guide rail fitted at its longitudinal edges into said grooves in the opposed upper and lower surfaces of said second and third members to permit relative sliding of said members longitudinally of said grooves.

References Cited in the file of this patent

UNITED STATES PATENTS

| Number | Name | Date |
|---|---|---|
| 502,011 | Frauenstein | July 25, 1893 |
| 536,552 | Swift | Mar. 26, 1895 |
| 1,110,333 | Moine | Sept. 15, 1914 |
| 1,712,854 | Thonet | May 14, 1929 |
| 1,828,460 | Emerson | Oct. 20, 1931 |
| 1,891,052 | Ott | Dec. 13, 1932 |
| 1,972,827 | Nenninger | Sept. 4, 1934 |

FOREIGN PATENTS

| Number | Country | Date |
|---|---|---|
| 335,150 | France | Nov. 14, 1903 |
| 365,738 | Great Britain | Jan. 28, 1932 |